(12) United States Patent
Broghammer et al.

(10) Patent No.: US 10,654,129 B2
(45) Date of Patent: May 19, 2020

(54) LASER PROCESSING HEADS WITH A CROSS-JET NOZZLE

(71) Applicant: TRUMPF Laser- und Systemtechnik GmbH, Ditzingen (DE)

(72) Inventors: Gerhard Broghammer, Boesingen (DE); Jeremy Meyer, Leonberg (DE); Volker Rominger, Stuttgart (DE)

(73) Assignee: TRUMPF Laser- und Systemtechnik GmbH, Ditzingen (DE)

( * ) Notice: Subject to any disclaimer, the term of this patent is extended or adjusted under 35 U.S.C. 154(b) by 593 days.

(21) Appl. No.: 15/244,098

(22) Filed: Aug. 23, 2016

(65) Prior Publication Data

US 2016/0354866 A1 Dec. 8, 2016

Related U.S. Application Data

(63) Continuation of application No. PCT/EP2015/053744, filed on Feb. 23, 2015.

(30) Foreign Application Priority Data

Feb. 27, 2014 (DE) .......................... 10 2014 203 576

(51) Int. Cl.
*B23K 26/142* (2014.01)
*B23K 26/14* (2014.01)
*B23K 26/064* (2014.01)

(52) U.S. Cl.
CPC .......... *B23K 26/142* (2015.10); *B23K 26/064* (2015.10); *B23K 26/1435* (2013.01); *B23K 26/1476* (2013.01)

(58) Field of Classification Search
CPC ........................... B23K 26/064; B23K 26/142; B23K 26/1435; B23K 26/1476

(Continued)

(56) References Cited

U.S. PATENT DOCUMENTS

| 5,359,176 | A | | 10/1994 | Balliet et al. |
| 5,685,999 | A | | 11/1997 | Wiedemann et al. |
| 5,770,833 | A | * | 6/1998 | Kanaoka ............ B23K 26/1476 |
| | | | | 219/121.67 |

(Continued)

FOREIGN PATENT DOCUMENTS

| CN | 102066039 A | 5/2011 |
| CN | 102112267 A | 6/2011 |

(Continued)

OTHER PUBLICATIONS

International Search Report for corresponding PCT Application No. PCT/EP2015/053744, dated Jul. 10, 2015, 6 pages.

(Continued)

*Primary Examiner* — Tu B Hoang
*Assistant Examiner* — Vy T Nguyen
(74) *Attorney, Agent, or Firm* — Fish & Richardson P.C.

(57) ABSTRACT

A laser machining head includes a focusing optical unit for focusing a laser beam in a direction of a machining zone of a workpiece and includes a cross-jet nozzle for producing a cross flow that passes through the focused laser beam transversely (e.g., at a right angle to) a beam axis of the focused laser beam. The distance of the cross-jet nozzle from the workpiece is less than 20 mm (e.g., between 8 mm and 12 mm). A nozzle body having a bottom opening that faces downward toward the workpiece is provided laterally adjacent to the focused laser beam. A protective gas flows out of the bottom opening, which is arranged below the cross-jet nozzle in order to entrain the protective gas flowing between the nozzle body and the workpiece due to the cross flow of the cross-jet nozzle so that the protective gas flows over the machining zone.

14 Claims, 2 Drawing Sheets

(58) Field of Classification Search
USPC .... 219/121.63–69, 121.73, 121.84; 372/109, 372/701; 604/313, 317, 1, 4; 451/40, 451/102; 428/192; 65/24, 112–165, 29
See application file for complete search history.

(56) References Cited

U.S. PATENT DOCUMENTS

| | | | | |
|---|---|---|---|---|
| 5,981,901 | A * | 11/1999 | La Rocca | B23K 26/123 |
| | | | | 219/121.63 |
| 6,204,475 | B1 * | 3/2001 | Nakata | B23K 26/147 |
| | | | | 219/121.84 |
| 2005/0224470 | A1 * | 10/2005 | Burt | B23K 26/147 |
| | | | | 219/121.63 |
| 2009/0134132 | A1 | 5/2009 | Verna et al. | |
| 2011/0114610 | A1 | 5/2011 | Szelagowski et al. | |
| 2013/0233836 | A1 * | 9/2013 | Dackson | B23K 26/1476 |
| | | | | 219/121.64 |
| 2015/0196989 | A1 * | 7/2015 | Hashish | B24C 7/0046 |
| | | | | 451/40 |

FOREIGN PATENT DOCUMENTS

| | | |
|---|---|---|
| CN | 102325627 A | 1/2012 |
| DE | 4433675 A1 | 3/1996 |
| DE | 202004017854 U1 | 1/2005 |
| DE | 102004014510 B4 | 6/2009 |
| EP | 0618037 B1 | 6/1997 |
| EP | 0985484 A2 | 3/2000 |
| JP | 5970487 A | 4/1984 |
| JP | 62187591 A | 8/1987 |
| JP | 5185266 A | 7/1993 |
| JP | 6122089 A | 5/1994 |
| JP | 9314373 A | 12/1997 |
| JP | 11267874 A | 10/1999 |
| JP | 2000263276 A | 9/2000 |
| JP | 2005177760 A | 7/2005 |

OTHER PUBLICATIONS

Kamimuki et al., "Prevention of welding defect by side gas flow and its monitoring method in continuous wave Nd: YAG laser welding", Journal of Laser Applications, vol. 14, No. 3, Aug. 2002. 10 pages.

Oiwa et al., "Optical Properties of Laser-Induced Plume during High Power Laser Welding", International Congress of Applications of Laser and Electro-Optics, ICALEO, 2009, 7 pages.

* cited by examiner

LASER PROCESSING HEADS WITH A CROSS-JET NOZZLE

CROSS-REFERENCE TO RELATED APPLICATIONS

This application is a continuation of and claims priority under 35 U.S.C. § 120 to PCT Application No. PCT/EP2015/053744 filed on Feb. 23, 2015, which claims priority to German Application No. DE 10 2014 203 576.7, filed on Feb. 27, 2014. The entire contents of these priority applications are incorporated herein by reference.

TECHNICAL FIELD

The present disclosure relates to laser processing heads including focusing optics for focusing a laser beam in a direction of a processing zone of a workpiece and a cross-jet nozzle for generating a transverse flow that passes through the focused laser beam transversely, as well as to associated methods.

BACKGROUND

During laser welding workpieces, a capillary (e.g., providing a region in which a workpiece to be machined is locally melted) may be formed in a processing zone. Due to continuously high energy input into the capillary by the laser beam, metal vapor emerges from the capillary or from a melt bath surrounding the capillary and rises in the form of small particles in a workpiece region surrounding the processing zone. A part of the laser beam focused onto the workpiece by a laser processing head is absorbed by the metal vapor particles, which are thereby heated and therefore emit thermal radiation due to their very high temperature. Accordingly, a metal vapor flame is formed.

A spatial configuration (e.g., an extent) of the metal vapor flame may vary greatly as a function of time and position during processing of the workpiece. In correspondence to this behavior of the metal vapor flame, the temperature and, concomitantly, the refractive index likewise vary greatly as a function of time and position, such that a thermal lens is formed, which causes laser radiation to deviate from a desired level with high temporal dynamics. Temporally and locally inhomogeneous energy input into the workpiece due to the thermal lens has a negative effect on the quality of workpiece processing. For example, in the case of laser welding, such effects can lead to weld splatters, to weld bead variations in the form of irregular bead curvatures, or generally to a degraded weld bead geometry.

The formation of a metal vapor flame, as well as propagation of weld gases, smoke, and the like, furthermore entails the problem that the rising metal vapor or the particles contained in the rising welding gases are increasingly deposited on focusing optics of the laser processing head and degrade the functionality thereof (e.g., by thermally induced focal spot displacement). This problem is particularly pronounced as a result of metal splatters that occur during the laser processing because the metal splatters are accelerated in an uncontrolled manner out of the melt bath in the direction of the focusing optics and burn into the focusing optics.

In order to obtain an improved process result (e.g., an improved bead quality), the interaction between the laser radiation and the metal vapor flame can be reduced. This is achieved by maintaining a region of the focused laser beam that lies below the processing optics substantially free of a mixture of welding gases and hot ambient air by providing at least one gas flow that is directed onto the focused laser beam and that passes through the focused laser beam. The gas flow is generated by one or more gas nozzles and is directed obliquely onto the processing zone or obliquely onto a region upstream of the processing zone on the workpiece. In order to protect the focusing optics from metal splatters, a transverse air flow (e.g., a cross-jet) is furthermore generated by a cross-jet nozzle that is positioned close to the focusing optics. The transverse air flow passes through the focused laser beam transversely to a beam axis of the focused laser beam and deflects the metal splatters before they reach the focusing optics.

SUMMARY

Implementations of the present disclosure can limit an extent of an interaction between laser radiation and a metal vapor flame to a region disposed as close as possible to and above a workpiece during a workpiece processing operation carried out by a laser processing head. For example, this object may be achieved by limiting a distance from a cross-jet nozzle to the workpiece to less than 20 mm (e.g., to between 8 mm and 12 mm).

In some embodiments, the metal vapor flame occurring during laser welding is reduced to a minimal height as a result of a close position of the cross-jet to the workpiece. In comparison to known standard cross-jet distances from the workpiece, the close proximity of the cross-jet to the workpiece discussed herein can lead to an improved bead quality, less splattering, a greater welding depth, fewer welding depth variations, greater process windows, improved protection of focusing optics from weld splatters, and a substantially lower compressed air consumption (e.g., about 40 l/min as compared to about 200 l/min for standard cross-jets) due to the smaller flow belt located close to the workpiece.

In addition, protective gas coverage of a weld bead can also be utilized. Accordingly, a nozzle body advantageously has a bottom opening that faces down toward the workpiece, out of which a protective gas flows. The bottom opening is located laterally next to the focused laser beam and arranged below the cross-jet nozzle such that the protective gas flowing out of the bottom opening is entrained between the nozzle body and the workpiece by a transverse flow provided by the cross-jet nozzle in the transverse direction such that the protective gas flows over the processing zone. The air draft provided by the cross-jet nozzle that is located close to the workpiece is used to flow the protective gas very close to the weld position in the transverse direction. Accordingly, a desired prevention of melting from oxide and optimal protection of optics from smoke and weld splatters can be achieved.

In some embodiments, a device (e.g., a fine-meshed metal wire fabric) that allows the protective gas to flow laminarly onto the formed weld bead is provided upstream of the bottom opening. The bottom opening may be formed by one tube end of a tube section that is connected at its other tube end (e.g., via a throttle) to a protective gas feed. In some embodiments, an axis of the tube end at which the bottom opening is located is oriented obliquely and pointed in a downward direction toward the focused laser beam so that the protective gas flows out of the bottom opening obliquely and downward with a flow component in the direction of the transverse flow.

In some embodiments, the nozzle body has a second bottom opening that faces downward toward the workpiece, out of which a protective gas also flows. The second bottom opening is located adjacent to the first bottom opening along a side of the first bottom opening that faces away from the focused laser beam (e.g., counter to a welding direction of the laser processing head). The second bottom opening supplies the weld bead with additional protective gas (e.g., supplemental to the protective gas supplied by the first bottom opening that has been advanced in the welding direction) and therefore protects against oxidation for a longer period of time. In some embodiments, a device (e.g., a fine-meshed metal wire fabric) that allows the protective gas to flow laminarly onto the formed weld bead is provided upstream of the second bottom opening. The second bottom opening may be formed by an outlet end of a line section that is connected at its other line end (e.g., via a throttle) to the protective gas feed. In some embodiments, an axis of the outlet end of the line section is oriented parallel to the beam axis, so that the protective gas flows laminarly out of the second bottom opening downwardly and parallel to the beam axis. The length of the bottom opening in the transverse direction determines a gas resupply length and should be as large as possible (e.g., two times as great as the length of the first bottom opening).

In some embodiments, the entire nozzle body or at least the lower side of the nozzle body that faces toward the workpiece is advantageously made of copper, since copper exhibits low splatter adhesion and can be cleaned well.

In some embodiments, the nozzle body is mounted adjustably in height on the laser processing head so that a Z distance of the nozzle body from the workpiece can be adjusted. Furthermore, in some embodiments, the nozzle body is fastened releasably (e.g., with magnets) to the laser processing head so that different nozzle bodies can be replaced very rapidly with one another. The releasable fastening at the same time provides collision protection, since the connection of the nozzle body to the laser processing head is automatically released in the event of a collision of the nozzle body with the workpiece.

In some embodiments, the cross-jet nozzle may be arranged on the laser processing head independently of the nozzle body. In some embodiments, the cross-jet nozzle may be arranged on the nozzle body. In the latter case, different nozzle bodies together with their air and protective gas feeds can be changed very rapidly.

Implementations of the present disclosure also relate to a method for laser processing a workpiece, in which a laser beam is focused in a direction of a processing zone of a workpiece and in which a transverse flow emerges from a cross-jet nozzle and passes through a focused laser beam transversely (e.g., perpendicularly) to a beam axis of a focused laser beam. During the processing of the workpiece, the distance from the cross-jet nozzle to the workpiece is less than 20 mm (e.g., between 8 mm and 12 mm).

Other advantages may be found in the claims, the description, and the drawings. Likewise, the features mentioned above and those yet to be described below may be used independently or in any desired combination with one another. The embodiments shown and described are not to be understood as an exhaustive list, but rather are of exemplary nature.

DETAILED DESCRIPTION

Figure 1:
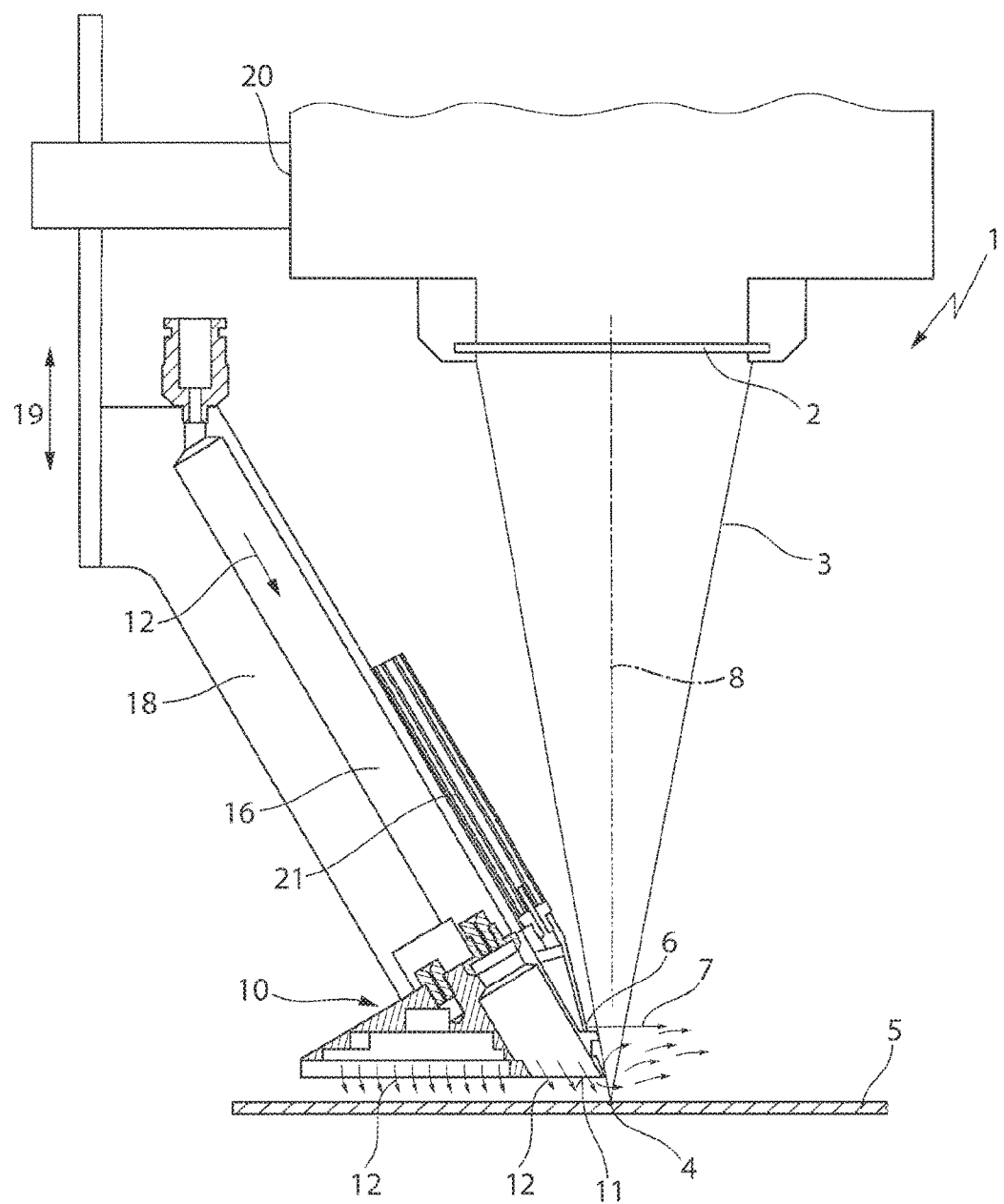
FIG. 1 shows a laser processing head including a nozzle body represented in cross section.
Figure 2:
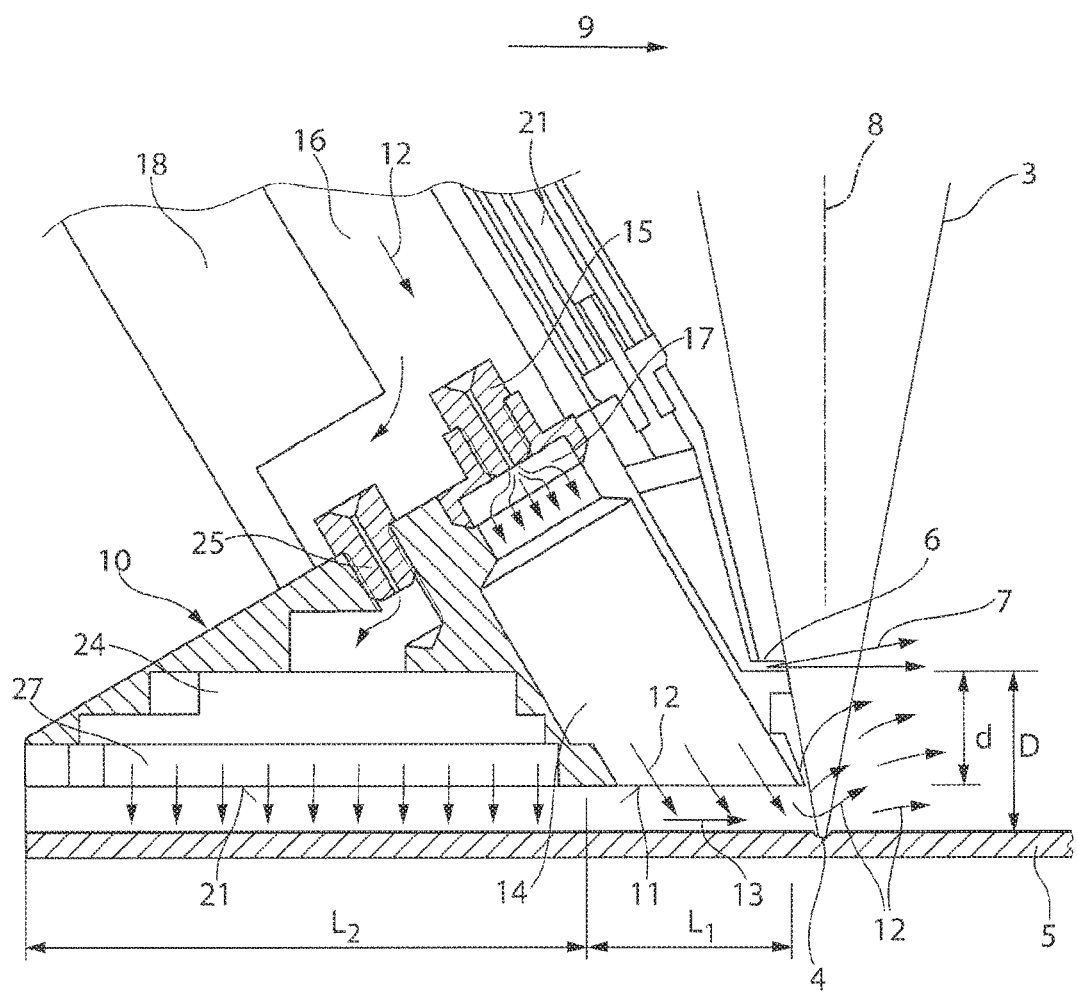
FIG. 2 shows an enlarged, detailed view of a portion of FIG. 1.

FIG. 1 shows a laser processing head 1 including focusing optics 2 that focus a laser beam 3 in the direction of a processing zone 4 of a workpiece 5. The laser processing head 1 also includes a cross-jet nozzle 6 with a Venturi effect that generates a transverse air flow 7 (e.g., a cross-jet 7) that passes through the focused laser beam 3 transversely to the beam axis 8 and protects the focusing optics 2 against vapors and splatters. The laser processing head 1 is moved over the workpiece 5 in a welding direction 9, and the working distance D (as shown in FIG. 2) of the cross-jet nozzle 6 from the workpiece 5 is about 10 mm. In some embodiments, the cross-jet nozzle 6 has an outlet cross-sectional area of 0.25×7 mm$^2$ and is operated with an air flow of about 35-40 l/min. Tests have shown that, as a result of the transverse flow 7 being located close to the workpiece, a metal vapor flame occurring during laser welding is limited to a minimal height, resulting in formation of an optimal weld bead.

The laser processing head 1 also includes a nozzle body 10 located on the same side of the focused laser beam 3 as the cross-jet nozzle 6. The nozzle body 10 has a first bottom opening 11 that faces downward toward the workpiece 5, out of which a protective gas 12 flows downwardly. The first bottom opening 11 is arranged close to and below the cross-jet nozzle 6 fastened on the nozzle body 10, such that the protective gas 12 flowing between the nozzle body 10 and the workpiece 5 is sucked by the transverse flow 7 of the cross-jet nozzle 6 in a transverse direction 13 and is entrained at least to such an extent that it flows over the processing zone 4. The first bottom opening 11 extends perpendicularly to the beam axis 8, extends parallel to an upper side of the workpiece 5, has a rectangular cross section of 10-100 mm$^2$, and is arranged at a distance d of about 5 mm below the cross-jet nozzle 6.

The first bottom opening 11 is formed by one tube end of a tube section 14 that is connected at its other tube end via a throttle 15 to a protective gas feed 16. Immediately downstream of the throttle 15, a device 17 (e.g., a fine-meshed metal wire fabric) is provided in order to generate a laminar flow of the protective gas 12 in the tube section 14. An axis of the tube section 14 (e.g., or of the tube end on the outlet side) is oriented obliquely and pointed in a downward direction toward the focused laser beam 3 so that the protective gas 12 flows laminarly out of the first bottom opening 11 obliquely and downwardly with a flow component in the direction of the transverse flow 7.

The nozzle body 10 optionally has a second bottom opening 21 that faces downward toward the workpiece 5, out of which the protective gas 12 also flows laminarly. The second bottom opening 10 is located adjacent to the first bottom opening 11 on the side facing away from the focused laser beam 3. The second bottom opening 21 is formed by an outlet end of a line section 24 that is connected at its other line end via a throttle 25 to the protective gas feed 16. A device 27 (e.g., a fine-meshed metal wire fabric) is provided in the outlet end of the line section 24 in order to cause the protective gas 12 to flow laminarly out of the second bottom opening 21. An axis of the outlet end is oriented parallel to the beam axis 8 so that the protective gas 12 flows out downwardly, laminarly, and parallel to the beam axis 8 from the second bottom opening 21. A length L2 of the second bottom opening 21 in the welding direction 9 is about two times as great as a length L1 of the first bottom opening 11.

For a simple gas supply to the weld bead, a nozzle body 10 having a single bottom opening 11 is used. If a longer linear gas supply to the weld bead is needed counter to the welding direction 9, a nozzle body 10 having both bottom openings 11, 21 is used. The fine-meshed metal wire fabrics are prefabricated inserts, which can be replaced easily and simply when they are clogged by weld splatters.

The nozzle body 10 is fastened on a holder 18 that is mounted adjustably in height (refer to the double arrow 19 in FIG. 1) in the direction of the beam axis 8 on the laser processing head 1. The nozzle body 10 is fastened on the laser processing head 1 along a magnetic interface 20. According to a height adjustment (a Z adjustment), the distances from the cross-jet nozzle 6 and the nozzle body 10 to the workpiece 5 can be adjusted individually. The magnetic interface 20 is also used at the same time as collision protection, since the magnetic fastening of the nozzle body 10 is released from the laser processing head 1 in the event of a collision of the nozzle body 10 with the workpiece 5.

The protective gas feed 16 extends inside the holder 18, and a compressed air feed 21 for the cross-jet nozzle 6 is fastened externally on the holder 18. The nozzle body 10 is advantageously made of copper, since copper exhibits low splatter adhesion and can be cleaned well.

A number of embodiments have been described. Nevertheless, it will be understood that various modifications may be made without departing from the spirit and scope of the present disclosure. Accordingly, other embodiments are within the scope of the following claims.

What is claimed is:

1. A laser processing head, comprising:
   focusing optics for focusing a laser beam in a direction of a processing zone of a workpiece;
   a cross-jet nozzle having a transverse end opening portion for generating a transverse flow that passes through the focused laser beam perpendicularly to a beam axis of the focused laser beam for protecting the focusing optics from vapors and splatters; and
   a height-adjustable nozzle body out of which a protective gas flows,
   wherein the cross-jet nozzle is arranged at a distance (D) of between 8 mm and 12 mm from the workpiece, wherein the height-adjustable nozzle body includes a bottom opening that faces downward toward the workpiece, and wherein the bottom opening is arranged below the cross-jet nozzle such that the protective gas flows out of the height-adjustable nozzle body and between the height-adjustable nozzle body and the workpiece adjacent the transverse flow of the cross-jet nozzle in a transverse direction and such that the protective gas is entrained by the transverse flow to cause the protective gas to flow over the processing zone.

2. The laser processing head of claim 1, wherein a distance (d) from the bottom opening to the cross-jet nozzle is less than 10 mm.

3. The laser processing head of claim 1, further comprising a meshed structure for generating a laminar flow of the protective gas upstream of the bottom opening.

4. The laser processing head of claim 1, wherein the bottom opening is formed by a first tube end of a tube section that is connected at a second tube end to a protective gas feed via a throttle.

5. The laser processing head of claim 4, wherein an axis of the first tube end of the tube section is oriented obliquely and pointed in a downward direction toward the focused laser beam.

6. The laser processing head of claim 1, wherein the bottom opening is a first bottom opening, wherein the height-adjustable nozzle body further includes a second bottom opening that faces downward toward the workpiece and that is located adjacent the first bottom opening along a side that faces away from the focused laser beam, and wherein the protective gas also flows out of the second bottom opening.

7. The laser processing head of claim 6, further comprising a meshed structure for generating a laminar flow of the protective gas upstream of the second bottom opening.

8. The laser processing head of claim 6, wherein the second bottom opening is formed by an outlet end of a line section that is connected at another line end to a protective gas feed via a throttle.

9. The laser processing head of claim 8, wherein an axis of the outlet end of the line section is oriented parallel to the beam axis.

10. The laser processing head of claim 6, wherein, in the transverse direction, a length (L2) of the second bottom opening is at least as great as a length (L1) of the first bottom opening.

11. The laser processing head of claim 1, wherein at least a lower side of the height-adjustable nozzle body that faces toward the workpiece is made of copper.

12. The laser processing head of claim 1, wherein the height-adjustable nozzle body is mounted adjustably in height on a portion of the laser processing head.

13. The laser processing head of claim 12, wherein the height-adjustable nozzle body is fastened magnetically to the portion of the laser processing head.

14. The laser processing head of claim 1, wherein the cross-jet nozzle is arranged on the height-adjustable nozzle body.

* * * * *